(12) United States Patent
Ruan

(10) Patent No.: US 10,544,850 B2
(45) Date of Patent: Jan. 28, 2020

(54) VISCOUS DAMPER ASSEMBLY HAVING LOCKOUT FUNCTION

(71) Applicant: ITT Manufacturing Enterprises LLC, Wilmington, DE (US)

(72) Inventor: Shubin Ruan, Williamsville, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 15/771,609

(22) PCT Filed: Nov. 4, 2016

(86) PCT No.: PCT/US2016/060486
§ 371 (c)(1),
(2) Date: Apr. 27, 2018

(87) PCT Pub. No.: WO2017/083186
PCT Pub. Date: May 18, 2017

(65) Prior Publication Data
US 2018/0328440 A1    Nov. 15, 2018

Related U.S. Application Data

(60) Provisional application No. 62/252,834, filed on Nov. 9, 2015.

(51) Int. Cl.
*F16F 9/18* (2006.01)
*F16F 9/44* (2006.01)
*F16F 9/56* (2006.01)
*F16F 9/32* (2006.01)

(52) U.S. Cl.
CPC ............ *F16F 9/185* (2013.01); *F16F 9/3242* (2013.01); *F16F 9/44* (2013.01); *F16F 9/56* (2013.01)

(58) Field of Classification Search
CPC ...... F16F 9/185; F16F 9/56; F16F 9/44; F16F 9/3242; B60G 17/08; B60G 13/06
See application file for complete search history.

(56) References Cited

U.S. PATENT DOCUMENTS

| 4,337,850 A | 7/1982 | Shimokura |
| 4,493,659 A | 1/1985 | Iwashita |

(Continued)

FOREIGN PATENT DOCUMENTS

| CN | 102128231 A | 7/2011 |
| CN | 104204602 A | 12/2014 |

(Continued)

OTHER PUBLICATIONS

International Search Report and Written Opinion; dated Feb. 27, 2017; 11 pgs.

(Continued)

*Primary Examiner* — Vishal R Sahni
(74) *Attorney, Agent, or Firm* — Barclay Damon LLP

(57) ABSTRACT

A hydraulic damping assembly includes a housing having a first moving end and a second opposing fixed end. A lockout assembly disposed at the fixed end of the housing includes at least one lockout pin that is configured to selectively occlude an orifice extending into at least one fluidic circuit interconnecting various hydraulic chambers of the damper.

10 Claims, 12 Drawing Sheets

100

(56) References Cited

U.S. PATENT DOCUMENTS

| | | | |
|---|---|---|---|
| 5,799,758 A * | 9/1998 | Huang | A63B 21/0083 |
| | | | 188/285 |
| 6,105,988 A | 8/2000 | Turner et al. | |
| 6,120,049 A | 9/2000 | Gonzalez et al. | |
| 6,382,370 B1 | 5/2002 | Girvin | |
| 7,325,661 B2 | 2/2008 | Chen | |
| 8,894,050 B2 | 11/2014 | Wootten et al. | |
| 2011/0100775 A1 | 5/2011 | Foister et al. | |
| 2012/0001399 A1* | 1/2012 | Coombs | B60G 17/08 |
| | | | 280/124.161 |
| 2012/0160621 A1 | 6/2012 | Battlogg et al. | |
| 2012/0235332 A1 | 9/2012 | Jordan et al. | |
| 2014/0069755 A1 | 3/2014 | Laird et al. | |
| 2014/0224607 A1 | 8/2014 | Becker et al. | |
| 2015/0061241 A1 | 3/2015 | Walthert et al. | |
| 2015/0075930 A1 | 3/2015 | Yablon et al. | |
| 2015/0081171 A1 | 3/2015 | Ericksen et al. | |
| 2015/0158364 A1* | 6/2015 | King | B60G 17/08 |
| | | | 188/314 |

FOREIGN PATENT DOCUMENTS

| | | |
|---|---|---|
| DE | 14 55 903 A1 | 6/1969 |
| EP | 0 202 941 A2 | 11/1986 |
| EP | 0 202 941 B1 | 2/1991 |
| JP | 2008-25694 A | 2/2008 |
| WO | WO 2013/143073 A1 | 10/2013 |

OTHER PUBLICATIONS

Chinese Office Action and Search Report for CN 201680065458.2; dated Apr. 1, 2019; 11 pgs.

* cited by examiner

VISCOUS DAMPER ASSEMBLY HAVING LOCKOUT FUNCTION

CROSS REFERENCE TO RELATED APPLICATION

This application is a national stage application under 35 U.S.C. § 371 of International Application No. PCT/US2016/060486, filed Nov. 4, 2016, which claims priority under applicable portions of 35 U.S.C. § 119 of U.S. Patent Application Ser. No. 62/252,834, filed Nov. 9, 2015, the entire contents of each application being herein incorporated by reference herein.

TECHNICAL FIELD

The subject matter of this application generally relates to the field of load damping assemblies and more specifically to a hydraulic damper assembly that includes an adjustable lockout function that can be effectively used for linear, as well as nonlinear loads.

BACKGROUND

Load damping assemblies are fairly well known in the field, such as those made by Applicant. In such damping assemblies, there are situations or needs in which the damper assembly should be intentionally disabled or "locked out" for reasons of maintenance of a structural system, for example, a tuned mass damper system.

For background purposes, one known version of a hydraulic damper assembly 10 having a lockout function is depicted in FIGS. 1 and 2. This damper assembly 10 is defined by a cylindrical housing 14 that includes a hollow cylindrical tube 16 axially disposed within the interior of the housing 14. The damper assembly 10 includes a moving end 18 that is attached to a load (not shown) and an opposing end 22 that is securably fixed to a support (not shown). A clevis 24, 25 is provided on each of the moving and fixed ends 18, 22 of the assembly 10 to provide attachment capability to each of the load and the support, using spherical bearings 26 provided in each clevis 24, 25. A piston assembly 28 is movably disposed within the confines of the cylindrical housing 14 at the moving end 18 of the assembly 10, the piston assembly 28 including a piston rod 30 and piston 34 that is caused to move though a defined hydraulic chamber 38 provided within the housing 14 and more specifically the interior of the hollow cylindrical tube 16. The ends of the hollow cylindrical tube 16 are secured to a cylinder end assembly 44 that is attached at the fixed end 22 of the damping assembly 10, and a bearing retainer 52 is fixedly attached to the opposing end of the housing 14 at the moving end 18 of the assembly 10.

Upon movement based on an imparted load, a damping force is created when the piston assembly 28 is either extended (loaded in tension) or retracted within the housing 14 (loaded in compression) in which the piston rod is sized to move through a sealed center opening formed in the bearing retainer 52. When in compression, hydraulic fluid is moved through a set of axial orifices 48 formed in the cylinder end assembly 44. This fluid is directed to a spacing 50 that is formed between the outer surface of the hollow cylindrical tube 16 and the interior surface of the housing 14. An accumulator 53 made from foam or other suitable material is provided in the defined spacing or chamber 50, the accumulator 53 spanning an axial portion of the assembly 10. The accumulator 53 is wrapped about the shock tube portion of the assembly with a gap being provided between wrapped ends (not shown)

In tension and as the piston rod 30 is extended, the check valves in the piston head 34 are closed and hydraulic fluid can only be moved to the accumulator chamber 50 through an axial orifice 24 that is formed in the body of the bearing retainer 52. As a result, high dynamic pressure is obtained in the fluid chamber between the piston 34 and the bearing retainer 52. On the other hand and due to movement of the piston 34, the fluid chamber between the piston 34 and the cylinder end assembly 44 draws hydraulic fluid from the accumulator chamber 50 through check valves in the cylinder end assembly 44. As a result, low dynamic pressure is obtained in the fluid chamber between the piston 34 and the cylinder end assembly 44. While in tension, the orifice 24 is at the downstream side of the valve. In normal operation, the adjustment valve is fully open, and therefore the orifice provides the desired damping property. When the adjustment valve is closed, the hydraulic fluid is blocked at the valve and having no place to otherwise go, the damper essentially becomes a rigid strut, producing lock-out in tension.

In compression and as the piston rod 30 is compressed, the check valves in the piston head 34 are open and the check valves in the cylinder end assembly 44 are closed. As a result, hydraulic fluid between the piston 34 and the cylinder end assembly 44 can only be moved through the check valves in the piston head to the fluid chamber between the piston 34 and the bearing retainer 52 and then through an axial orifice 24 that is formed in the body of the bearing retainer 52. As a result, high dynamic pressure is obtained in both the fluid chambers between the bearing retainer 52 and the piston 34. Due to the differential area of the piston, a compressive damping force is obtained. When the adjustment valve is fully closed, the retained hydraulic fluid is blocked by the closed valve and having no place to go, the damper becomes a rigid valve producing lock-out in compression.

According to this version, a lockout sub-assembly 90 is provided at the moving end 18 of the assembly 10. This lockout sub-assembly 90 is specifically defined by a spring-loaded plunger 94 attached to the bearing retainer 52 that can be moved into and out of engagement with the defined axial orifice (not shown). Because the lockout sub-assembly 90 is provided at the moving end 18 of the damper assembly 10, any adjustments are difficult and hazardous to make. In addition, the assembly 10 is limited in terms of operation in that damping is only realized for dynamic (V-squared) loads and not realized for linearly imparted loads.

Accordingly, there is a general need in the field to provide a damping assembly having a more versatile lockout function to enable improved access when this function is desired. It is a further desire to provide a damper having a lockout function that can be effectively used in tension and compression under a variety of load conditions.

BRIEF DESCRIPTION

Therefore and according to one aspect, there is provided a hydraulic assembly comprising a housing having a piston assembly movably attached to a first end of the assembly, the assembly having a second opposing end configured for attachment to a fixed support. The piston assembly is moved within a hollow cylindrical tube axially disposed within the housing, the piston assembly defining adjacent chambers that are each filled with a hydraulic fluid. Upon axial movement of the piston, hydraulic fluid is moved between the hydraulic chambers via a fluidic circuit defined about the hollow cylindrical tube. A lockout assembly defined in the fixed end includes at least one pin member that is adjustably movable into a fluid passage of the fluidic circuit to regulate the flow of hydraulic fluid.

According to another aspect, there is provided a hydraulic damper assembly comprising a housing having an interior, a first end, and a second opposing end. The first end is configured for attachment to a fixed support and the second end is configured for attachment to a structure under load. A hollow cylindrical tube is axially disposed within the housing interior, and a piston assembly is axially movable within the interior of the hollow cylinder. The piston assembly includes a piston head and a piston rod extending from the second end of the housing. According to this claim, the piston defines variably sized adjacent chambers within the hollow cylindrical tube, each chamber being filled with a hydraulic fluid. A first end assembly is sealingly fitted to the first end of the housing and a second end assembly sealingly fitted to the second end of the housing in which the second end assembly includes a sealed opening through which the piston assembly translatably moves under load. A hydraulic or fluidic circuit includes fluid passages formed in each of the first and second end assemblies as well as a tubular member axially disposed between the exterior of the hollow cylindrical tube and an inner surface of the housing. The fluidic circuit interconnects each of the adjacent chambers and permits hydraulic fluid to move between the adjacent chambers based on movement of the piston assembly when under load. The damper further includes a lockout assembly disposed within the first end assembly, and including at least one pin that is adjustably movable to selectively occlude a fluid passage of the fluidic circuit.

One advantage provided by the herein described damping assembly is that the design permits use in a number of loading conditions and in which lockout adjustment is easily enabled by a user.

Another advantage realized is that the lockout function can be easily adjusted and further be used in order to adjust or otherwise fine-tune the damping constant of the assembly.

Yet another advantage provided by the herein described assembly is that the design permits use in a number of damping configurations (i.e., linear damping and non-linear damping) and in which lock-out adjustment is easily enabled by the user.

These and other features and advantages will be readily apparent from the following Detailed Description, which should be read in conjunction with the accompanying drawings.

DETAILED DESCRIPTION

The following relates to an exemplary hydraulic damper (also referred to throughout as a "damper assembly" or "damping assembly") that can be configured for use under both linear and non-linear loading conditions. As discussed herein, the damping assembly includes at least one lockout feature that permits easier adjustment than prior versions and in which the damper assembly is configured to provide adequate damping in tension, as well as compression modes of operation for a tunable mass or other structure. It will be understood that the specific application for the herein described assembly and related method can be suitably varied. In addition, certain terms are used throughout in order to provide a suitable frame of reference in regard to the accompanying drawings. These terms, which include "inner", "outer", "distal", "proximal" "interior", "exterior" and the like are not intended to narrow the overall scope of the invention, including the claims, and should not be so interpreted unless expressly specified.

As used herein, the terms "about" or "approximately" for any numerical values or ranges indicate a suitable dimensional tolerance that allows the part or collection of components to function for its intended purpose, as described herein. More specifically, "about" or "approximately" may refer to the range of values not at least ±20% of the recited value. Also throughout the course of discussion, the terms "above" and "below" are not limiting with regard to absolute orientation.

It should further be noted that the accompanying drawings are not necessarily presented to scale and therefore no narrowing interpretation should be made in terms of dimensions that have been depicted.

As used herein, the singular forms "a", "an" and "the" are intended to further include plural referents unless the context clearly dictates otherwise.

The terms "comprise", "comprises", "comprising", as used herein, are intended to imply that additional elements may be included and that a set of elements having any of these terms used in connection therewith connotes a minimum number that can be readily expanded.

The terms "include", "includes" and "including", as used herein, are intended to cover the same scope as the terms "comprise", "comprises" and "comprising", noted above.

Figure 1:
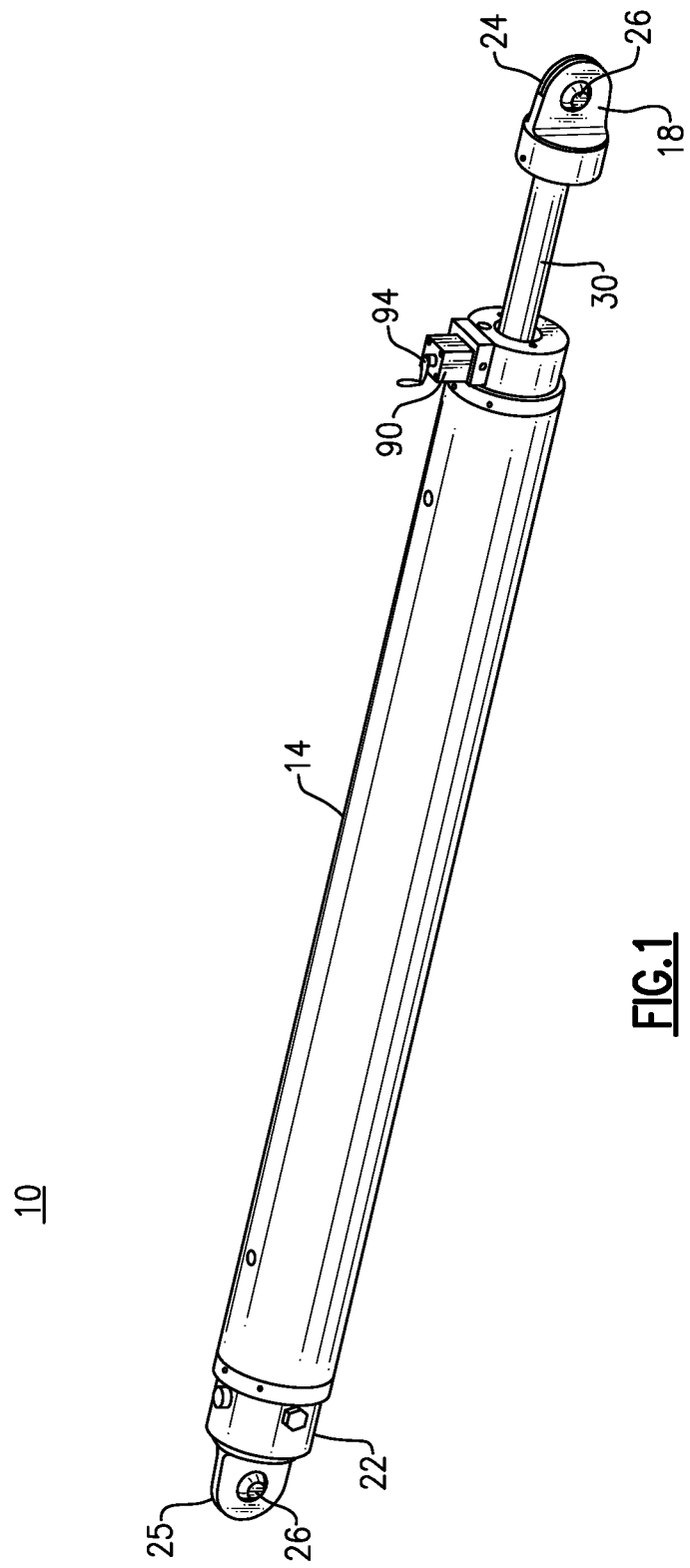
FIG. 1 is a perspective view of a hydraulic damping assembly made in accordance with the prior art.
Figure 2:
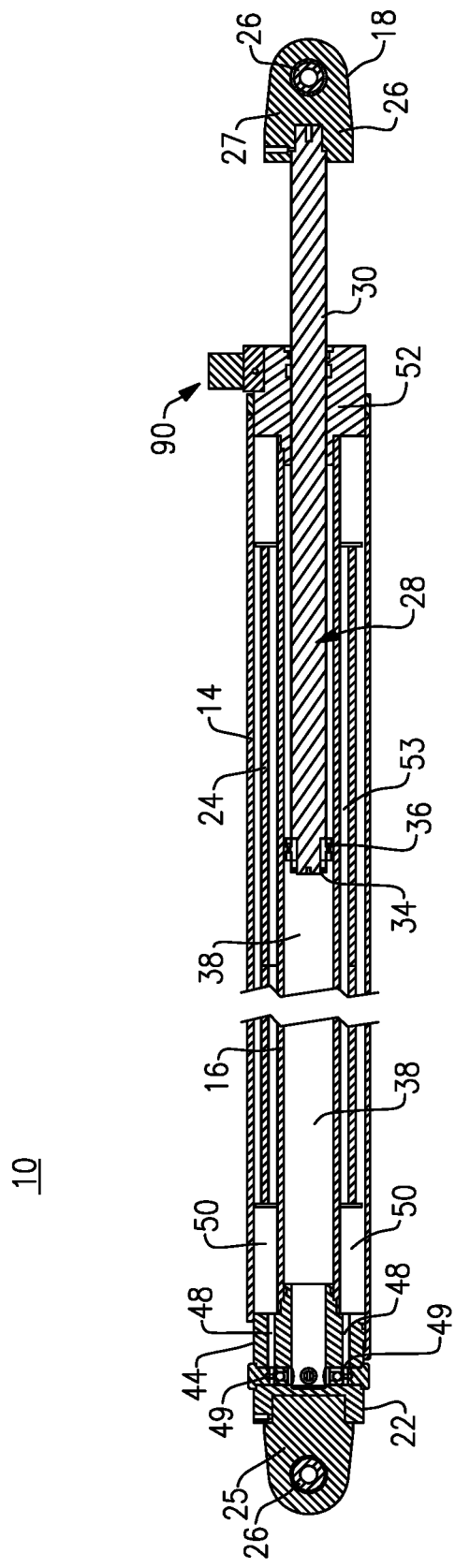
FIG. 2 is a side elevational view of the prior art hydraulic damping assembly of FIG. 1, shown in section.
Figure 3:
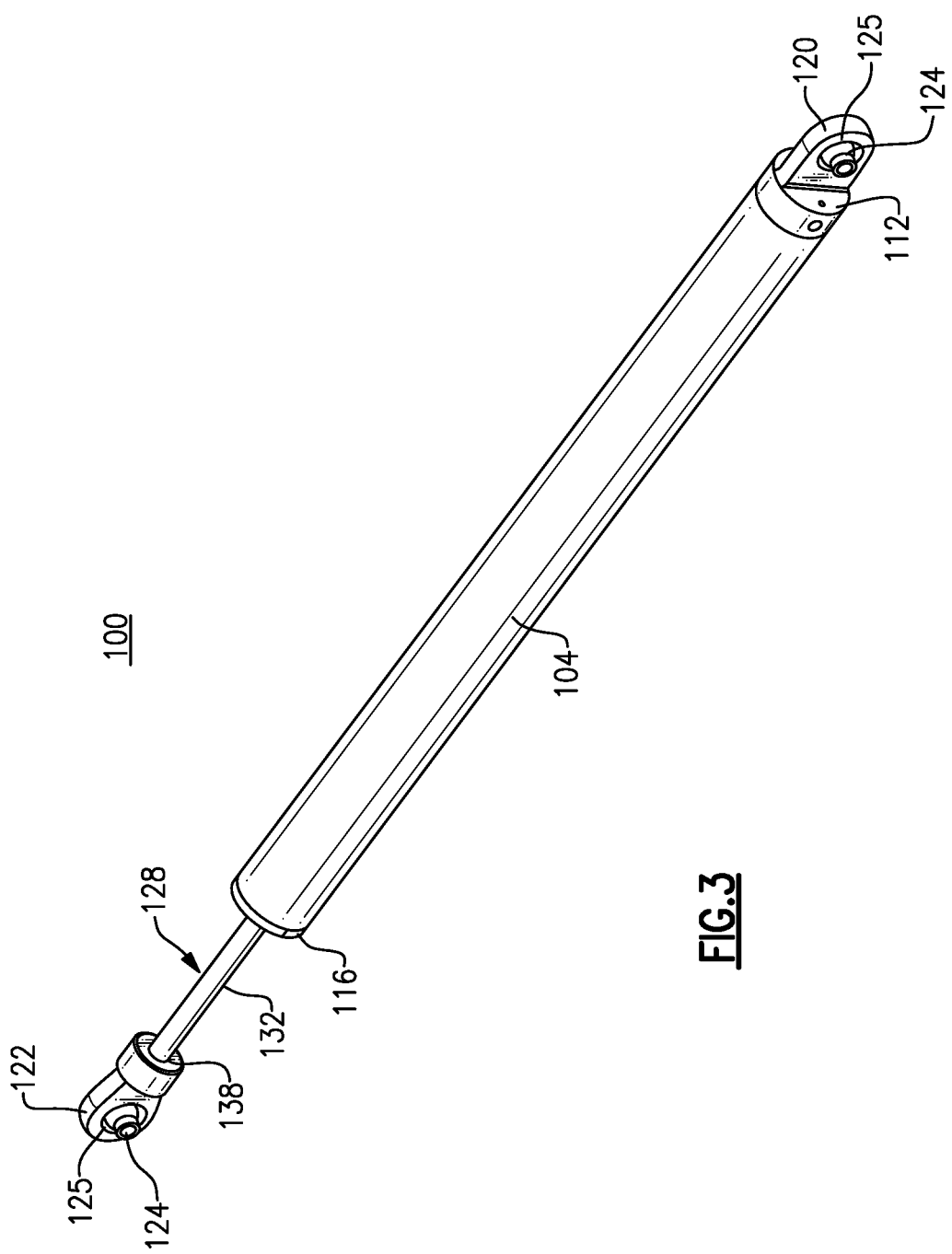
FIG. 3 is a perspective view of a hydraulic damper assembly in accordance with an exemplary embodiment.

Referring to the figures and more specifically to FIG. 3, there is shown a damper 100 (also referred to throughout as a "damper assembly") that is made in accordance with an embodiment. The damper 100 is defined by a cylindrical or other suitably shaped housing 104 having an interior 108, FIG. 4(a), that is sized and configured to retain a plurality of components, as discussed herein. The assembly 100 is defined by a first end 112 that is configured to be attached to a fixed support (not shown) and an oppositely second end 116 that supports a piston assembly 128 configured to be movably attached to a mass (not shown). Each of the first and second ends 112, 116 further include a clevis 120, 122 that is configured to enable attachment of the damper 100 to the fixed support and the mass or other structure under load (each not shown). Each clevis 120, 122 according to this embodiment can include a spherical bearing 124 that is retained within a transverse center opening 125 of the clevis 120, 122.

Referring to FIGS. 3 and 4(*a*), the piston assembly 128 includes a piston rod 132 and piston 136 configured for axial movement within the interior 108 of the housing 104 of the damper 100. The piston rod 132 extends from the second end 116 of the damper 100, including a proximal end 138 that is fixedly secured to the clevis 122 and a distal end 140 that retains the piston 136. The piston rod 132 extends through a sealed center opening 145 formed through a bearing retainer 144, the latter being fixedly mounted to the second end 116 of the housing 104. The piston assembly 128 is sized to move within a defined chamber within the housing 104 filled with a hydraulic fluid, the chamber being defined by a coaxially mounted hollow shock tube 148 that extends along the entire axial span of the housing 104.

An accumulator 150, made from foam or other suitable material, is further disposed about the majority of the exterior of the shock tube 148 with the exception of a circumferential portion thereof. The accumulator 150 is attached to the exterior of the shock tube 148 using suitable adhesives or other securing means, such as tie wraps, and is disposed between the inner surface of the cylindrical housing 104 and the exterior surface of the shock tube 148. The thickness of the accumulator 150 permits a small amount of radial clearance therebetween. The circumferential portion of the shock tube 148 that is not covered by the accumulator 150 defines a channel 151 extending over the axial span of the damper 100 that enables the placement of a portion of a hydraulic fluid loop circuit and more specifically a tubular member 153. Each of the channel 151 and the tubular member 153 can be better seen with reference to FIG. 8. The channel 151 is sized to receive the tubular member 153, which also axially spans the housing 104 and is configured to move hydraulic fluid.

With reference to FIGS. 4(*a*) and 4(*c*), the cylinder end assembly 156 fitted within the first end 112 of the damper housing 104 is a unitary body made from a structural material that includes a shoulder 160 formed on an inner facing end 164 that engages an end of the shock tube 148, as well as one edge of the accumulator 150. The clevis 120 is either integral with this assembly 156 or can be a separate component fixedly secured to an outer facing side thereof using fasteners or other suitable means.

With reference to FIGS. 4(*a*) and 4(*b*), the bearing retainer 144 fitted at the second end 116 of the damper housing 104 also includes a shoulder 146 formed on an inner facing end 149 to similarly engages an opposing end of the shock tube 148 and edge of the accumulator 150. At least one sealing member 152, such as an elastomeric ring, is disposed within an annular groove or notch formed on the exterior of the body of the bearing retainer 144. When seated, the extending portion of the sealing member 152 is placed in compressive contact with the internal surface of the housing 104. The shock tube 148 can be secured in place to each of the bearing retainer 144 and the cylinder end assembly 156, FIG. 4(*c*), using set screws (not shown) or other suitable means to enable securement of the components in place.

As shown in FIG. 4(*a*), a portion of the interior of the housing 104 within the shock tube 148 through which the piston assembly 128 moves in an axial fashion (between the piston 136 and the bearing retainer 144) is herein referred to as a "tension chamber" 210, while the remainder of the interior 108 of the housing 104 that is formed within the shock tube 148 is referred to throughput as the "compression chamber" 218. The axial length and volume of the tension chamber 210 and the compression chamber 218 are variable based on the movement of the piston assembly 128, as discussed herein wherein the adopted nomenclature is useful for purposes of describing the operation of the damper 100.

With reference to the sectioned views FIGS. 4(*a*), 4(*b*) and 4(*c*), each of the bearing retainer 144 and the cylinder end assembly 156 according to this embodiment includes a plurality of formed passages that permit the ingress and egress of hydraulic fluid to and from the tension chamber 210 and compression chamber 218. This series of formed passages, as described herein, along with the tubular member 153, combine to define a continuous hydraulic loop or circuit.

Referring first to FIG. 4(*b*), the inner facing side 149 of the bearing retainer 144 includes an axial passage 147 that partially extends into the body of the bearing retainer 144. This axial passage 147, as discussed herein, engages one end 155 of the tubular fluid member 153, the end 155 being configured with a laterally extending portion that interconnects with the end of the axial passage 147. As shown, the axial passage 147 is fluidically coupled to the tension chamber 210.

Referring to FIG. 4(*c*) and at the opposite fixed end 112 of the assembly 100, an axial passage 170 extends inwardly from the inner facing end 164 of the cylinder end assembly 156 to the distal end of a lateral passage 176 that is configured and sized to retain an adjustably fitted lockout pin 180. Another similarly formed axial passage 184 extends from an intermediate portion of the lateral passage 176. The latter axial passage 184 extends toward the inner facing end 164 and is interconnected with the opposing end 185 of the tubular member 153 disposed between the outer surface of the shock tube 148 and the inner surface of the housing 104 within the channel 151. This end 185 of the tubular member 153 extends laterally into the cylinder end assembly 156 and directly into the axial passage 184 at an intermediate portion thereof. Though the axial passage 184, as shown, fully extends to the inner facing end 164 of the cylinder end assembly 156, this configuration is based on that ability to adequately form the passage 184. To prevent fluid from directly passing into the end of the axial passage to or from the compression chamber 218 without regulating, the end of the axial passage 184 retains a plug 187 or is otherwise sealed. As a result and in operation, only the axial passage 170 is fluidically coupled to the compression chamber 218. Passage of hydraulic fluid into and from the compression chamber 218 via the axial passage 184, on the other hand, is prevented.

Still referring to FIG. 4(*c*), the upper portion of the adjustable lockout pin 180 above the axial fluid passage 184 according to this exemplary embodiment includes a set of threads (not shown) that engage a corresponding set of threads (not shown) provided on the interior of an upper axial portion of the lateral passage 176. A hex head 181 is provided at the upper (proximal) end of the lockout pin 180 to permit adjustment. The opposing distal end of the pin 180 includes a tapered portion 182 that is sized to seat and occlude the axial passage 170 when suitably adjusted by a user, as discussed in greater detail below. In the meantime, the outer diameter of the adjustable lockout pin 180 along the lateral passage 176 is slightly smaller than the outer diameter of the lockout pin 180, thereby allowing hydraulic fluid to pass around the lockout pin 180 when the damper assembly 100 is in operation, and as discussed in greater detail below. Sealing features, such as O-rings or other elastomeric sealing members, are provided between the threaded portion at the proximal end of the lockout pin 180 and the intermediate axial passage 184 in order to prevent fluid leakage.

Figure 4A:
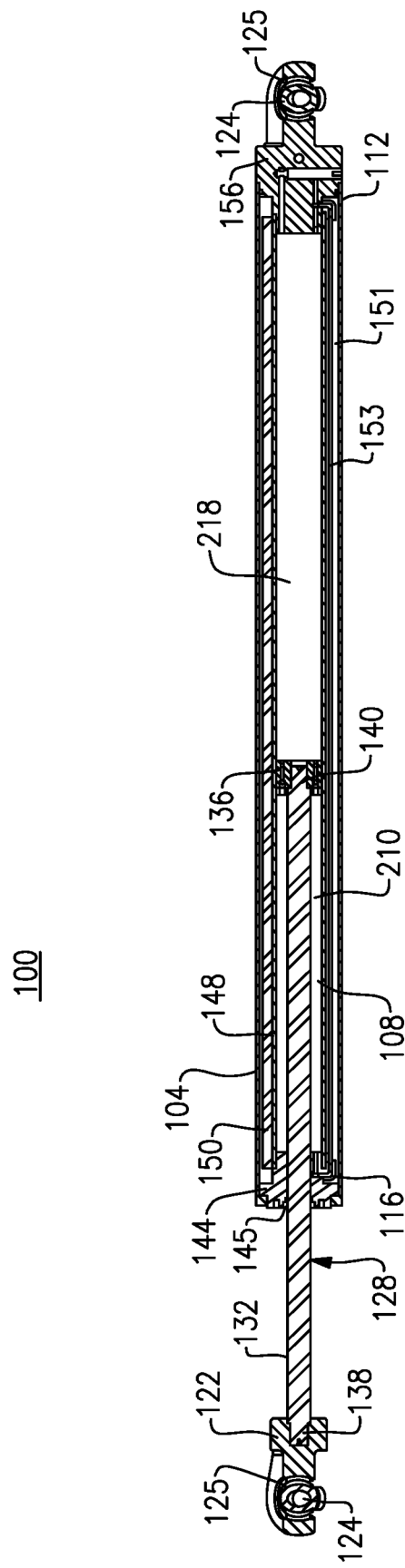
FIG. 4(a) is a side elevational view of the hydraulic damper assembly of FIG. 3, taken in section.

As noted, the foregoing structure defines a continuous hydraulic loop or circuit that is formed and fluidically coupled to the tension chamber 210 and the compression chamber 218 and in which fluid is moved based on the movement of the piston assembly 128, FIG. 4(a).

Figure 5A:
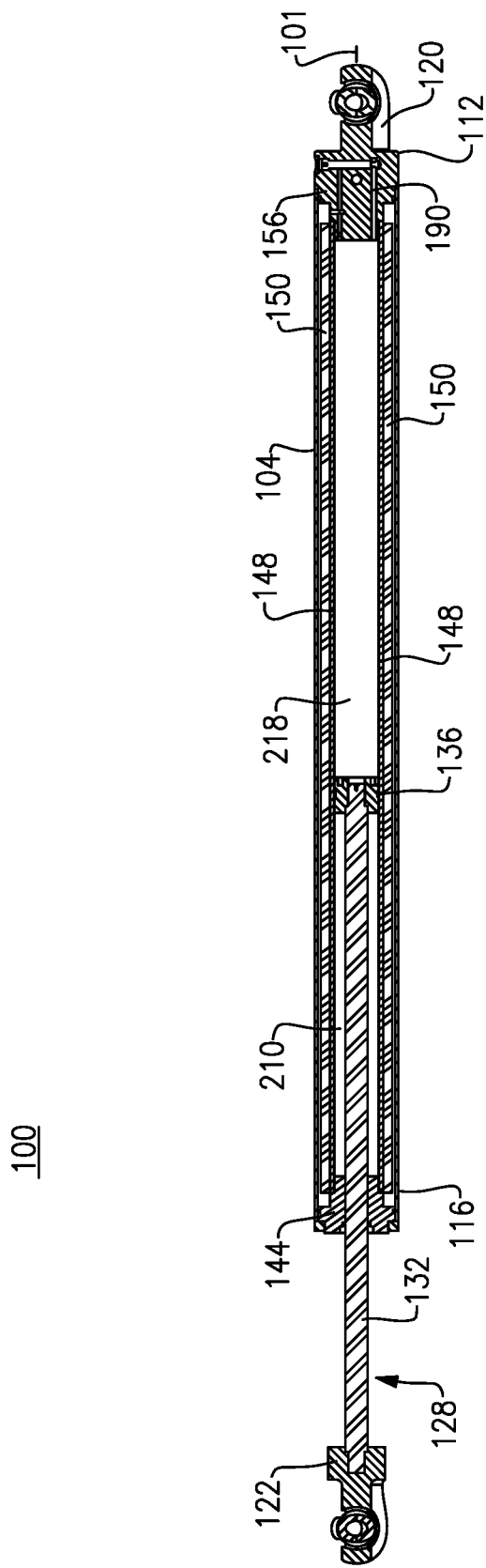
FIG. 5(a) is a side elevational view of the hydraulic damper assembly of FIG. 4(a), this view being rotated 90 degrees about the primary axis of the damper assembly.
Figure 5B:
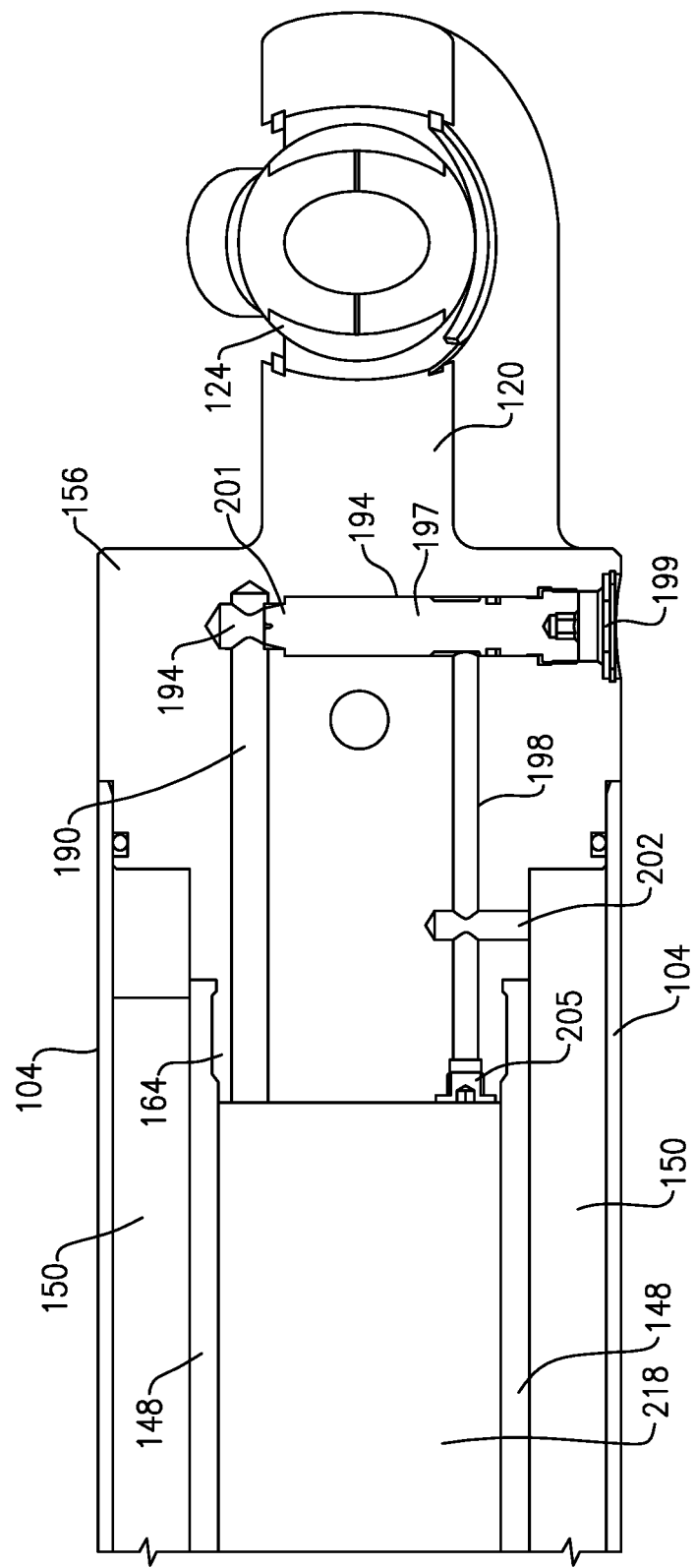
FIG. 5(b) is an enlarged sectioned view of a portion of the hydraulic damper assembly of FIG. 5(a)

Before discussing the operation of the damper 100 and referring to FIGS. 5(a) and 5(b), sectioned views are additionally provided that are 90 degrees rotated about the primary axis 101 of the damper 100 to better illustrate additional features of the cylinder end assembly 156, in particular. As shown most specifically in FIG. 5(b), another axial passage 190 extends from the inner facing end 164 of the cylinder end assembly 156 toward the clevis 120 and terminates at the distal end of a laterally extending passage 194 that retains an adjustable lockout pin 197. A portion of the laterally extending passage 194 is configured for movement of hydraulic fluid including about the exterior of an axial portion of the lockout pin 197 and extending to a formed intermediate axial passage 198 that extends toward the inner facing side 164. A lateral fluid passage 202 extends from the intermediate axial passage 198 into the outer spacing that includes the accumulator 150 circumferentially and axially spanning the damper 100. According to this exemplary version, though the axial passage 198 as depicted extends to the inner facing end 164 of the cylinder end assembly 156, the end retains a plug 205. As a result, hydraulic fluid will be permitted to pass to and from the compression chamber 218 via the axial passage 190, but not via the axial passage 198.

Similar to the adjustable lockout pin 180 previously described, the adjustable lockout pin 197 according to this embodiment includes a set of threads adjacent the proximal end thereof that engage a corresponding set of threads similarly formed within the lateral passage 194. In addition, the lockout pin 197 further includes a hex head 199 to permit threaded adjustment and the distal end of the lockout pin 197 includes a tapered portion 201 that is sized to seat and occlude the axial passage 190 when suitably adjusted by a user. To prevent leakage of hydraulic fluid, sealing features such as O-rings or other suitable members, are provided between the intermediate axial passage 198 and the threaded portion at the proximal end of the lockout pin 197.

When assembled, each of the tension chamber 210, the compression chamber 218 and the tubular channel 153 formed between the shock tube 148 and the housing 104 is filled with a hydraulic fluid using a fill plug (not shown). The cylinder end assembly 156, the piston assembly 128 and the bearing retainer 144 each contain respective seals that prevent fluid leakage from the damper 104, either statically or during operation.

Figure 4B:
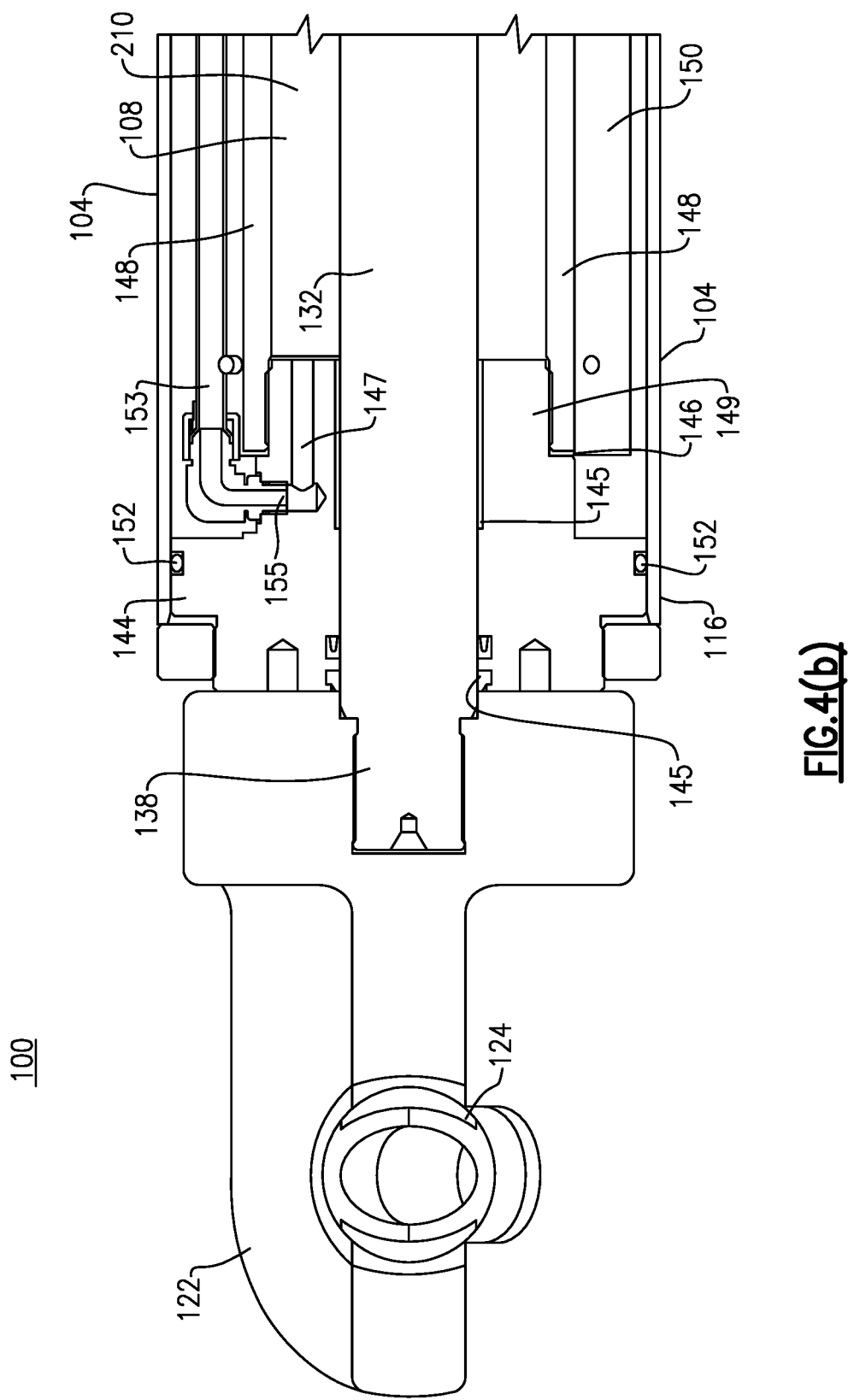
FIG. 4(b) is an enlarged sectioned view of an end portion of the hydraulic damper assembly of FIG. 3.
Figure 4C:
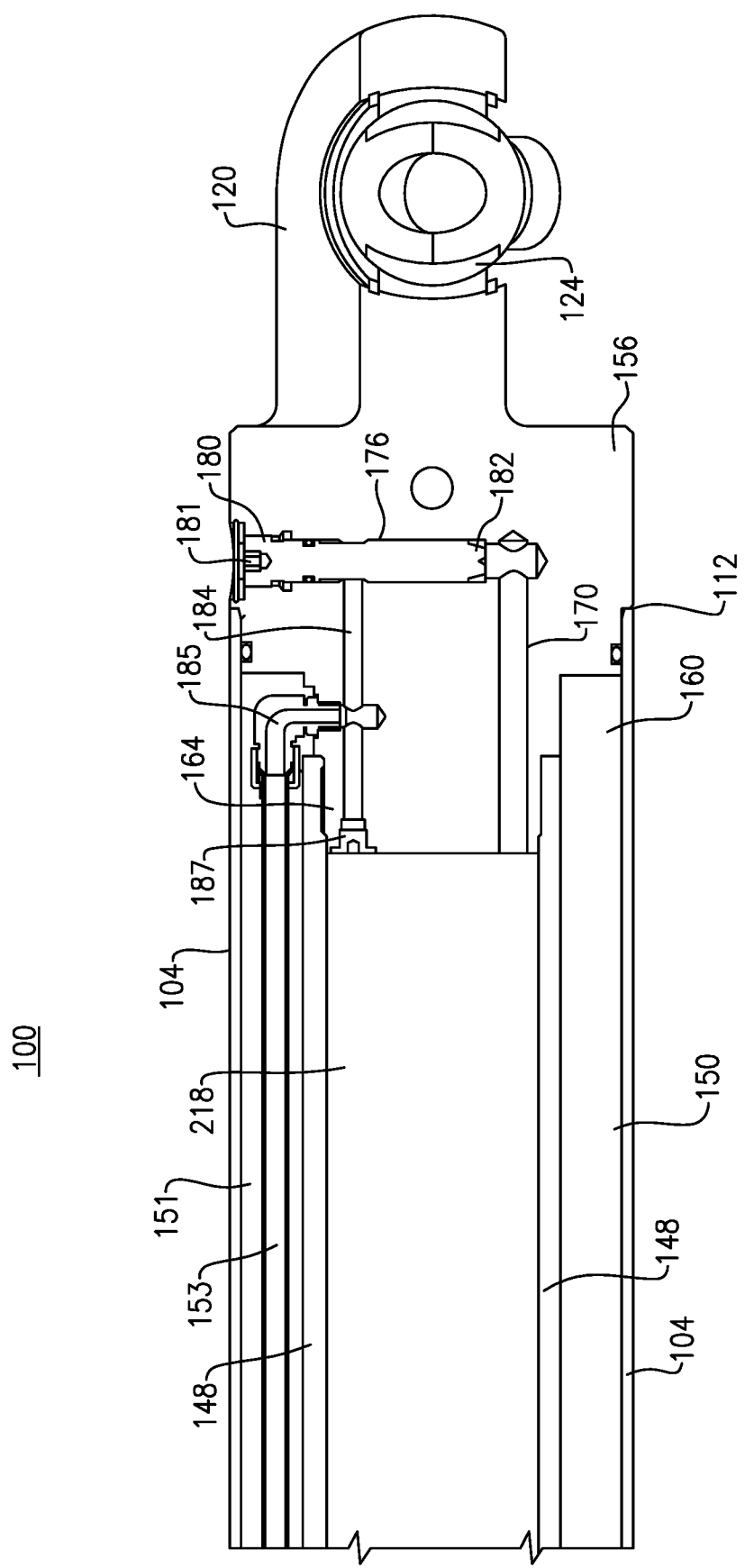
FIG. 4(c) is an enlarged sectioned view of an opposing end portion of the hydraulic damper assembly of FIGS. 3-4(b)

Loading conditions can occur that place the damper 100 in either a tension mode with the piston assembly 128 moving toward the end 116 or a compression mode in which the piston assembly 128 moves axially toward the fixed end 112 of the assembly 100. Referring first to FIGS. 4(a)-4(c), the operation of the damper assembly 100 in a tension mode is herein described. As noted, the piston assembly 128, and more specifically the piston rod 132, is caused to extend outwardly and axially from the damper housing 104 as the piston rod 132 moves through the sealed center opening 145 of the bearing retainer 144. As this axial movement occurs, hydraulic fluid contained within the tension chamber 210 is displaced under force into the axial passage 147 defined within the bearing retainer 144. This displaced hydraulic fluid is further directed under the force produced by the piston assembly 128 through the tubular member 153 provided between the shock tube 148 and the housing 104 and then through the various passages 185, 184, 176 and 170 formed within the cylinder end assembly 156. The displaced hydraulic fluid is moved as an annulus about the exterior of the adjustable lockout pin 180 in the passage 176 wherein the hydraulic fluid exits the axial passage 170 into the compression chamber 218, whose volume is increased as a result of the axial movement of the piston assembly 128 and decreased volume of the adjacent tension chamber 210. The movement of fluid creates a suitable damping force as the piston assembly 128 is retracted through the tension chamber 210.

Discussion is now made regarding the compression mode of operation of the herein described damper 100 wherein the piston assembly 128, including the piston rod 132, is moved through the sealed center opening 145 of the bearing retainer 144 toward the first or fixed end 112. In this embodiment and due to the volume occupied by the piston rod 132, the hydraulic fluid in the compression chamber 218 has a higher effective area than the hydraulic fluid in the adjacent tension chamber 210. As a result, the piston 136 is provided with a number of axial orifices 220, FIG. 6(b), that extend therethrough, each of the orifices 220 (herein referred to as "balancing orifices") having check valves 224 that are configured only to permit the flow of hydraulic fluid therethrough when in the compression mode of operation. According to this exemplary embodiment, two (2) equally spaced orifices 220 are provided, though this parameter can be suitably varied. That is to say and due to differential pressure between the adjacent hydraulic chambers 210, 218 in the tension mode of operation, hydraulic fluid is prevented from moving from the compression chamber 218 into the tension chamber 210 through the balancing orifices 220.

Figure 6A:
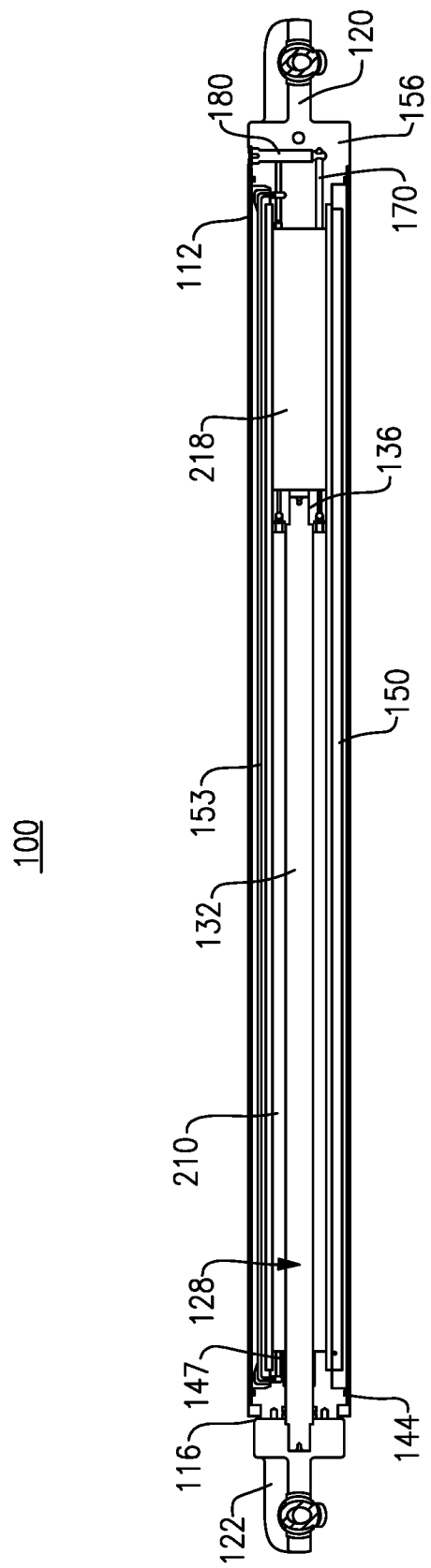
FIG. 6(a) is another the side elevational view of the hydraulic damper assembly of FIG. 3, with the piston assembly being moved into a compressed mode of operation.
Figure 6B:
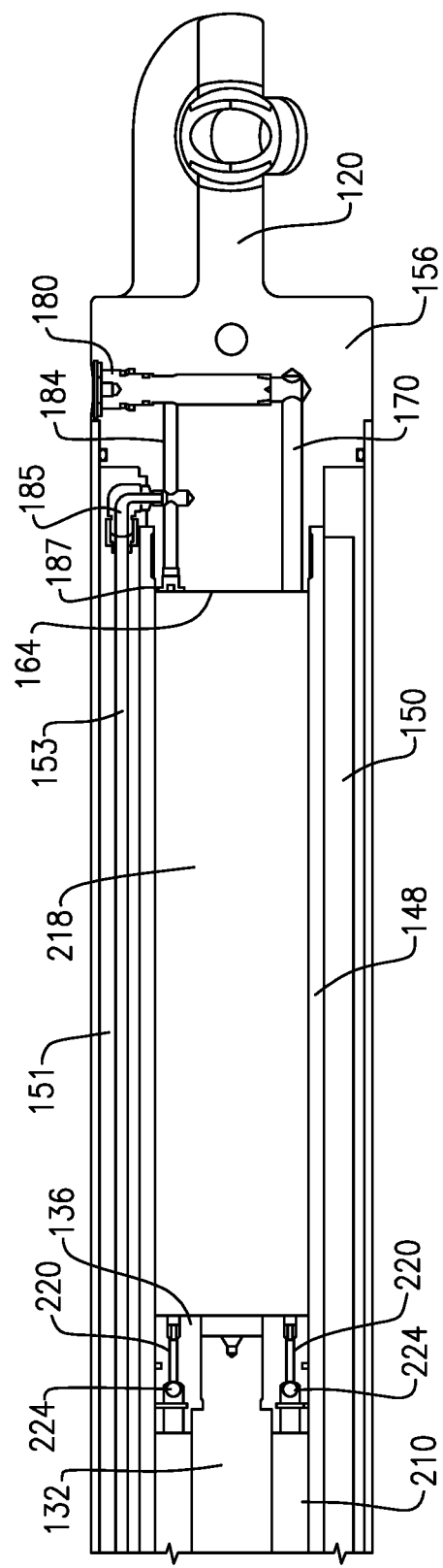
FIG. 6(b) is an enlarged view of an end portion of the hydraulic damper assembly of FIG. 6(a)

Reference is herein made to FIGS. 6(a) and 6(b). Contained hydraulic fluid in the compression chamber 218 is displaced due to the piston force acting on the hydraulic fluid in the compression chamber 218. As a result, a portion of this hydraulic fluid is forced into the axial passage 170 formed in the cylinder end assembly 156, about the retained lockout pin 180 and through each of the passages 184, 185 including the interconnected tubular member 153 of the defined hydraulic loop or circuit. The displaced hydraulic fluid exits the axial passage 147 to fill the tension chamber 210 as the piston assembly 128 is moved toward the cylinder end assembly 156.

With reference to FIGS. 5(a) and 5(b), another portion of the displaced hydraulic fluid is caused to pass through the axial passage 190, and the various fluidic passages of the sealed cylinder end assembly 156; that is, through the lateral passage 194 and about the exterior of the adjustable lockout pin 197, the intermediate axial passage 198 and lateral passage 202 into the circumferential and axial space occupied by the accumulator 150. This portion of the hydraulic fluid must also be moved in order to accommodate the larger sized compression chamber 218 and the volume of the extending piston rod 132, which remains in the tension chamber 210.

Figure 7:
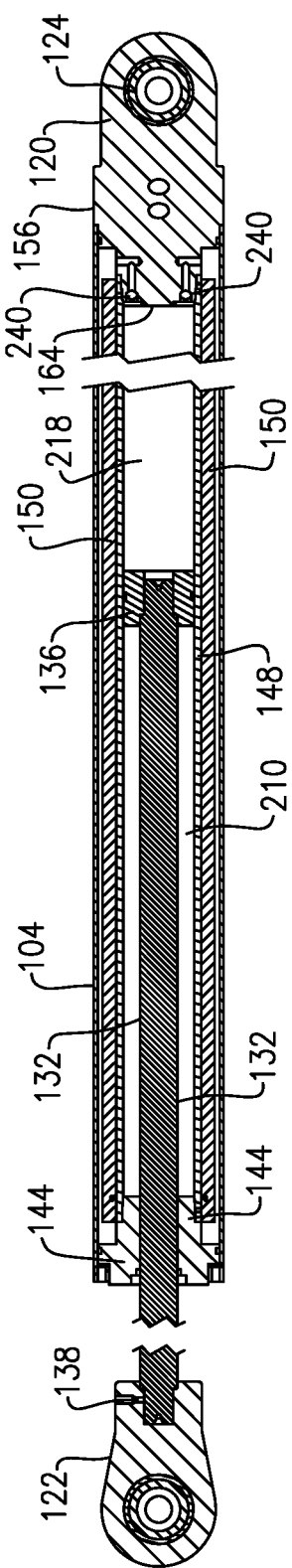
FIG. 7 is a side elevational view of the hydraulic damper assembly, shown in section and rotated about 45 degrees relative to that of FIG. 5(a)
Figure 8:
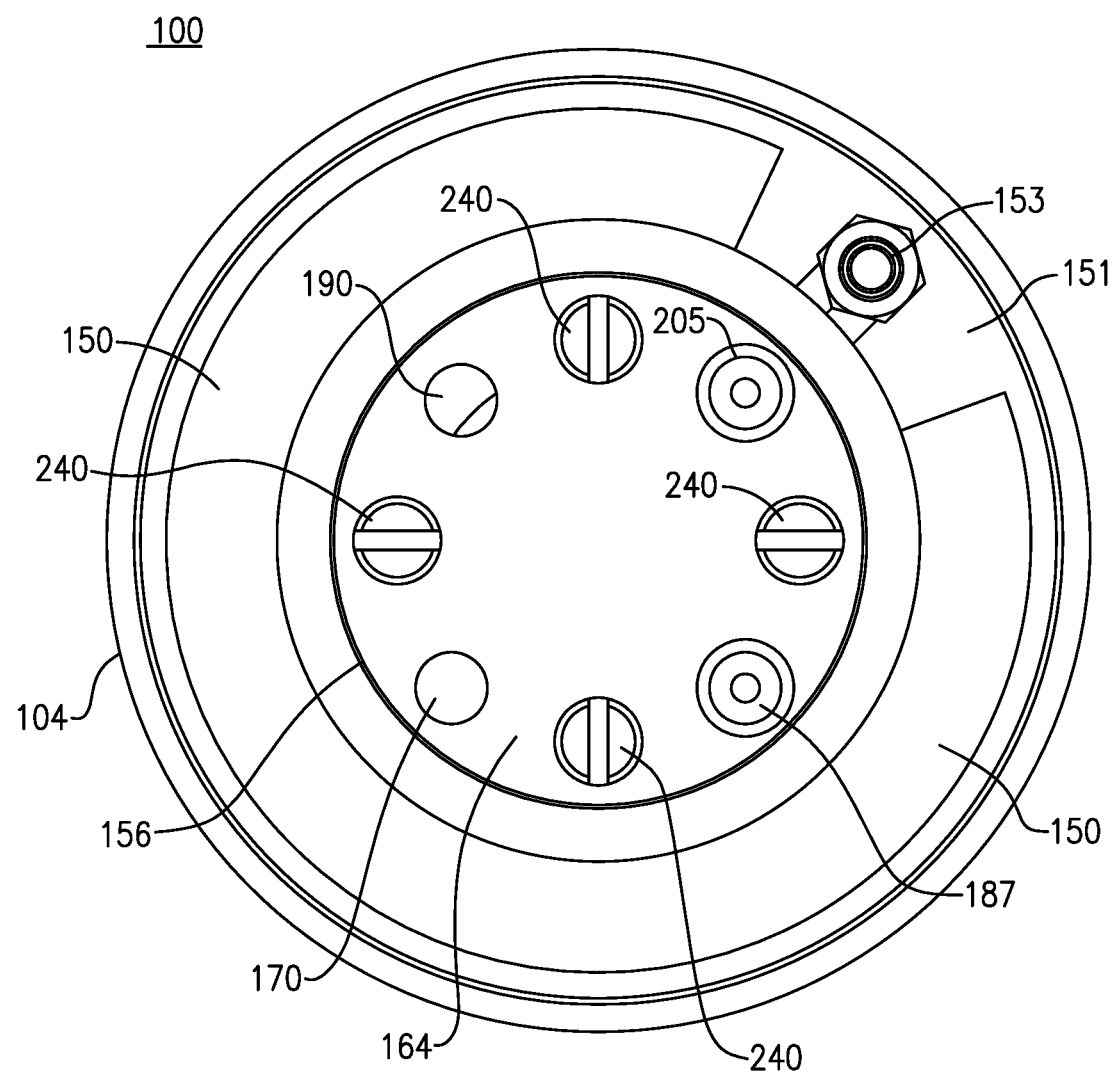
FIG. 8 is a partial end view of the hydraulic damping assembly of FIGS. 3-7.

Referring to FIGS. 7 and 8 and according to this specific embodiment, at least one set of check valves 240 are additionally provided within another corresponding set of axial passages 238 formed in the body of the cylinder end assembly 156 to enable hydraulic fluid from the accumulator 150 to be displaced back into the compression chamber 218 when the tension mode of operation of the herein described damper assembly 100 is resumed. As shown more clearly in FIG. 8, a total of four (4) axial passages 238 with corresponding check valves 240 being provided at 90 degree increments according to this exemplary embodiment. This parameter can be suitably varied, for example, depending on the diameter of the orifice of the axial passages 238. The check valves 240 prevent hydraulic fluid from entering any of the axial passages 238 during the compression mode of operation.

With reference to FIGS. 4(c), 5(b), and 6(b), and in order to adjust the herein described damper 100 for lockout, the adjustable lockout pin 180 can be axially adjusted by engagement of the hex head 181 which produces threaded movement of the pin 180 and enables the extending distal end of the lockout pin 180, and more specifically the tapered portion 182 to be wholly advanced to wholly block the axial passage 170. In similar fashion, the hex head 199 of the adjustable lockout pin 197 can be similarly engaged using an appropriate sized tool (e.g., wrench) to axially advance the pin 197 and the tapered distal portion 201 to occlude the axial passage 190. This adjustment prevents hydraulic fluid from movement within the defined hydraulic fluid circuit in either mode (compression or tension) of operation. Preferably, both lockout pins 180, 197 are adjusted in order to provide this latter function.

Similar adjustments can be made to partially occlude the axial passages 170, 190 using the adjustable lockout pins 180, 197 and thereby adjust or fine-tune the damping constant of the herein described damper assembly 100 in order to optimize overall performance of the assembly.

It will be readily apparent that numerous modifications and variations can be made within the inventive concepts that are described herein, including the following appended claims of this application.

The invention claimed is:

1. A hydraulic damper assembly comprising:
a housing having an interior, a first end, and a second opposing end wherein the first end is configured for attachment to a fixed support and the second end is configured for attachment to a structure under load;
a hollow shock tube axially disposed within the housing interior;
a piston assembly axially movable within the interior of the housing, the piston assembly including a piston and a piston rod extending from the second end of the housing, movement of the piston defining variably sized adjacent chambers within the hollow shock tube, each chamber being filled with a hydraulic fluid;
a cylinder end assembly sealingly fitted within the first end of the housing and a bearing retainer sealingly fitted at the second end of the housing, the bearing retainer including a sealed opening through which the piston assembly translatably moves;
a fluidic circuit comprising a tubular member disposed within the interior of the housing and exterior to the shock tube, the tubular member having ends connected to fluid passages formed in each of the cylinder end assembly and the bearing retainer, respectively, in which the fluid passage in the cylinder end assembly is further coupled by a first lateral passage to a first axial passage extending into the chamber adjacent the cylinder end assembly, the fluidic circuit interconnecting each of the adjacent chambers and configured for moving fluid between the chambers based on movement of the piston assembly under load;
an accumulator disposed about the exterior of the hollow shock tube, in which the cylinder end assembly further includes a second axial passage formed therein that is fluidically connected through a second lateral passage to the accumulator, each of the first and second axial passages and first and second lateral passages being separate from one another; and
a lockout assembly disposed within the cylinder end assembly, the lockout assembly including a first pin member and a second pin member, in which the first pin member is disposed in the first lateral passage and has a tapered portion sized to wholly block fluid flow to and from the first axial passage, and the second pin member is disposed in the second lateral passage and has a tapered portion sized and configured to wholly block fluid flow to and from the second axial passage.

2. The hydraulic damper assembly as recited in claim 1, wherein each of the first and second pin members includes a threaded portion that is configured to engage corresponding threads in the lateral passage supporting the pin member.

3. The hydraulic damper assembly as recited in claim 1, wherein hydraulic fluid is configured to flow about the exterior of each pin member when the tapered portion is not seated.

4. The hydraulic damper assembly as recited in claim 1, wherein the piston includes a plurality of axial orifices extending therethrough, each of the axial orifices having a check valve configured to limit flow between the adjacent chambers in one of tension or compression modes.

5. The hydraulic damper assembly as recited in claim 1, wherein the cylinder end assembly includes a plurality of third axial passages that permit fluid to flow from the spaced opening to one of the adjacent chambers when the load is relieved, each of the plurality of third axial passages including a check valve to permit one way movement of fluid.

6. A method for manufacturing a hydraulic damping assembly having lockout capability, the method comprising:
providing a housing having an interior, a first end and a second opposing end wherein the first end is configured for attachment to a fixed support and the second end is configured for attachment to a structure under load;
disposing a hollow shock tube within the housing interior;
disposing an axially movable piston assembly within the interior of the hollow shock tube, the piston assembly including a piston and a piston rod extending from the second end of the housing, wherein movement of the piston assembly defines variably sized adjacent chambers within the hollow shock tube, each chamber containing a hydraulic fluid;
providing a cylinder end assembly sealingly fitted to the first end of the housing and a bearing retainer sealingly fitted to the second end of the housing, the bearing retainer further including a sealed opening through which the piston assembly translatably moves;
providing a fluidic circuit comprising a tubular member disposed within the interior of the housing and exterior to the shock tube, the tubular member having ends connected to fluid passages formed in each of the cylinder end assembly and the bearing retainer, in which the fluid passage in the cylinder end assembly is further coupled to a first lateral passage and a first axial passage formed in the cylinder end assembly that extends into one of the adjacent chambers, the fluidic circuit interconnecting each of the adjacent chambers and configured for moving fluid between the chambers based on movement of the piston assembly under load;

disposing an accumulator about the exterior of the shock tube, wherein the cylinder end assembly further includes a second axial passage formed therein extending to the adjacent chamber that is fluidically connected through a second lateral passage to the accumulator, the first axial passage and first lateral passage being separate from the second axial passage and the second lateral passage; and providing a lockout assembly disposed within the cylinder end assembly, the lockout assembly including a first pin member and a second pin member, in which the first pin member is disposed in the first lateral passage and has a tapered portion sized to wholly block fluid flow to and from the first axial passage and the second pin member is disposed in the second lateral passage and has a tapered portion sized to wholly block fluid flow to and from the second axial passage.

7. The method as recited in claim 6, further comprising: providing the cylinder end assembly with a plurality of third fluid passages including at least one axial passage that permits fluid to flow from the accumulator to the chamber, each of the third passages including a valve to permit one way movement of fluid.

8. The method as recited in claim 6, further comprising providing each of the first and second pin members with a threaded portion configured to engage corresponding threads in the lateral passage supporting the pin member.

9. The method as recited in claim 8, wherein hydraulic fluid is configured to flow about the exterior of each pin member when the tapered portion is not wholly blocking the fluid passage.

10. The method as recited in claim 6, further configuring the piston with a plurality of axial orifices extending therethrough and further configuring the orifices with a check valve configured to enable flow in one direction of the piston assembly to limit flow.

\* \* \* \* \*